(12) United States Patent
Sano

(10) Patent No.: US 12,169,618 B2
(45) Date of Patent: Dec. 17, 2024

(54) STRETCHABLE ARRAY SUBSTRATE HAVING ELECTRICAL WIRING LINES STACKED ON RESIN BASE MEMBER

(71) Applicant: Japan Display Inc., Tokyo (JP)

(72) Inventor: Takumi Sano, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 18/347,610

(22) Filed: Jul. 6, 2023

(65) Prior Publication Data
US 2024/0019970 A1    Jan. 18, 2024

(30) Foreign Application Priority Data
Jul. 12, 2022 (JP) .................. 2022-111861

(51) Int. Cl.
G06F 3/044       (2006.01)

(52) U.S. Cl.
CPC .. G06F 3/0446 (2019.05); *G06F 2203/04102* (2013.01)

(58) Field of Classification Search
CPC .............. G06F 3/0446; G06F 2203/04102
See application file for complete search history.

(56) References Cited

U.S. PATENT DOCUMENTS

| | | | | |
|---|---|---|---|---|
| 2014/0055702 A1* | 2/2014 | Park | ............ | H10K 59/40 257/40 |
| 2014/0299362 A1* | 10/2014 | Park | ............ | H05K 1/0283 174/254 |
| 2016/0103534 A1* | 4/2016 | Zhang | ............ | G06F 1/169 345/173 |
| 2016/0111481 A1* | 4/2016 | Jeong | ............ | H10K 59/123 257/40 |
| 2016/0211471 A1* | 7/2016 | Kwon | ............ | G06F 1/1652 |
| 2016/0268352 A1* | 9/2016 | Hong | ............ | H10K 59/131 |
| 2017/0040306 A1* | 2/2017 | Kim | ............ | G06F 1/1652 |
| 2017/0110529 A1* | 4/2017 | Zhang | ............ | H10K 59/131 |
| 2018/0046221 A1* | 2/2018 | Choi | ............ | G06F 1/1637 |
| 2018/0090699 A1* | 3/2018 | Shin | ............ | H10K 59/131 |
| 2018/0114825 A1* | 4/2018 | Hong | ............ | H10K 59/121 |
| 2018/0182838 A1* | 6/2018 | Yeo | ............ | H10K 59/179 |
| 2018/0366345 A1* | 12/2018 | Hu | ............ | H10K 59/131 |
| 2021/0234108 A1 | 7/2021 | Sano | | |

FOREIGN PATENT DOCUMENTS

JP        2021-118273 A    8/2021

* cited by examiner

*Primary Examiner* — Adam J Snyder
(74) *Attorney, Agent, or Firm* — XSENSUS LLP (57) ABSTRACT

A stretchable array substrate includes: a resin base member and an array layer. The resin base member includes bodies disposed apart from each other and hinges that couple the bodies. The array layer includes electrical wiring lines stacked on the hinges. The hinges each includes a linear portion and a bend that meanders and couples second ends of two of the linear portions. The electrical wiring lines include: a first electrical line stacked on the linear portion; and a second electrical line stacked on the bend. The first electrical line is provided with: a joint stacked on the first end of the linear portion; and a thin wiring portion closer to the second end of the linear portion than the joint and having a length in a width direction intersecting a longitudinal direction of the first electrical line smaller than a length in the width direction of the joint.

6 Claims, 12 Drawing Sheets

STRETCHABLE ARRAY SUBSTRATE HAVING ELECTRICAL WIRING LINES STACKED ON RESIN BASE MEMBER

CROSS-REFERENCE TO RELATED APPLICATION

This application claims the benefit of priority from Japanese Patent Application No. 2022-111861 filed on Jul. 12, 2022, the entire contents of which are incorporated herein by reference.

BACKGROUND

1. Technical Field

What is disclosed herein relates to a stretchable array substrate.

2. Description of the Related Art

Stretchable array substrates have excellent flexibility and elasticity. In such stretchable array substrates, a resin base member and an array layer are stacked in order on a flat resin plate. The resin base member includes island-like bodies arrayed in a matrix (row-column configuration) and hinges that couple the bodies to each other. As described in Japanese Patent Application Laid-open Publication No. 2021-118273, the hinge has a meandering shape. When a load acts on the resin base member, the hinges deform. Transistors, LEDs, and other components are stacked on the bodies, and electrical wiring that supplies signals or the like to the transistors and other components is stacked on the hinges.

The electrical wiring deforms due to the deformation of the hinges. As a result, stress concentrates on a position overlapping the boundary between the body and the hinge (hereinafter also referred to as a joint) in the longitudinal direction of the electrical wiring, thereby making the joint likely to be broken. Therefore, it is desirable to develop stretchable array substrates that can reduce breakage of the joint of the electrical wiring.

For the foregoing reasons, there is a need for a stretchable array substrate that can suppress breakage of a joint of electrical wiring.

SUMMARY

According to an aspect, a stretchable array substrate includes: a resin base member; and an array layer stacked on the resin base member. The resin base member includes: a plurality of bodies disposed apart from each other; and a plurality of hinges that couple the bodies. The array layer includes electrical wiring lines stacked on the hinges. The hinges each includes: a linear portion having a linear shape when viewed in a stacking direction in which the resin base member and the array layer are stacked and having a first end coupled to a corresponding one of the bodies; and a bend that meanders when viewed in the stacking direction and couples second ends of two of the linear portions. The electrical wiring lines include: a first electrical line stacked on the linear portion; and a second electrical line stacked on the bend. The first electrical line is provided with: a joint stacked on the first end of the linear portion; and a thin wiring portion closer to the second end of the linear portion than the joint and having a length in a width direction intersecting a longitudinal direction of the first electrical line smaller than a length in the width direction of the joint when viewed in the stacking direction.

According to an aspect, a stretchable array substrate includes: a resin base member; and an array layer stacked on the resin base member. The resin base member includes: a plurality of bodies disposed apart from each other; and a plurality of hinges that couple the bodies. The array layer includes electrical wiring lines stacked on the hinges. The hinges each includes: a linear portion having a linear shape when viewed in a stacking direction in which the resin base member and the array layer are stacked and having a first end coupled to a corresponding one of the bodies; and a bend that meanders when viewed in the stacking direction and couples second ends of two of the linear portions. The electrical wiring lines include: a first electrical line stacked on the linear portion; and a second electrical line stacked on the bend. The first electrical line includes a joint stacked on the first end of the linear portion. The joint is made of any one of Au, Ag, and Cu.

DETAILED DESCRIPTION

Exemplary aspects (embodiments) to embody the present disclosure are described below in greater detail with reference to the accompanying drawings. The contents described in the embodiments below are not intended to limit the invention according to the present disclosure. Components described below include components easily conceivable by those skilled in the art and components substantially identical therewith. Furthermore, the components described below may be appropriately combined. What is disclosed herein is given by way of example only, and appropriate modifications made without departing from the spirit of the present invention and easily conceivable by those skilled in the art naturally fall within the scope of the present disclosure. To simplify the explanation, the drawings may possibly illustrate the width, the thickness, the shape, and other elements of each unit more schematically than the actual aspect. These elements, however, are given by way of example only and are not intended to limit interpretation of the present disclosure. In the present specification and the drawings, components similar to those previously described with reference to previous drawings are denoted by the same reference numerals, and detailed explanation thereof may be appropriately omitted.

When the term "on" is used to describe an aspect where a first structure is disposed on/above a second structure in the present specification and the claims, it includes both of the following cases unless otherwise noted: a case where the first structure is disposed on and in contact with the second structure, and a case where the first structure is disposed above the second structure with still another structure interposed therebetween.

While the present embodiment describes an example where a stretchable array substrate is used for a touch panel, the stretchable array substrate according to the present disclosure may be used for other devices, such as force sensors and display devices.

First Embodiment

Figure 1:
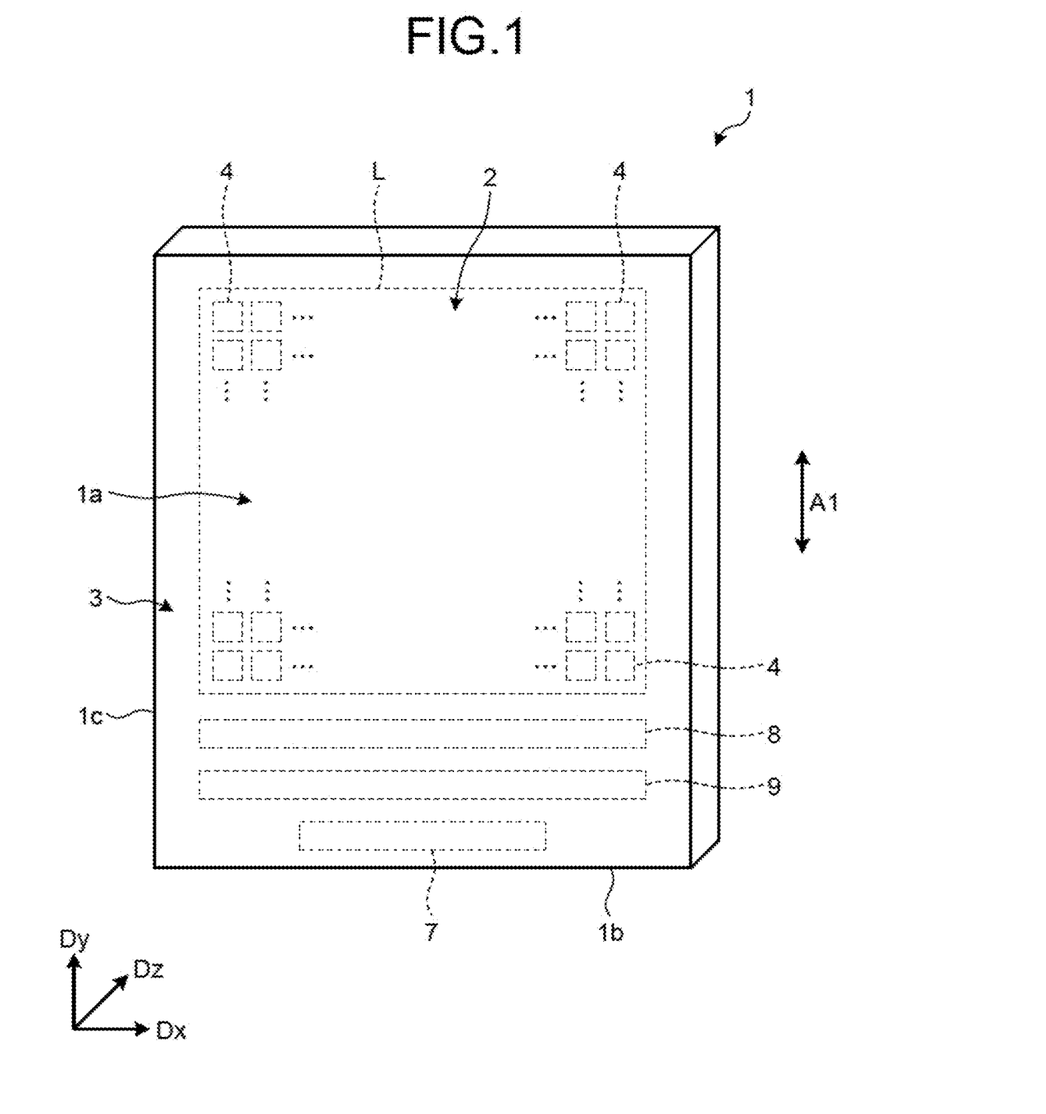
FIG. 1 is a schematic of a touch panel according to a first embodiment viewed from a detection surface.

FIG. 1 is a schematic of a touch panel according to a first embodiment viewed from a detection surface. As illustrated in FIG. 1, a touch panel 1 has a plate shape. One surface of the touch panel 1 serves as a detection surface 1a that detects a touch operation. The touch operation herein means "proximity to or contact with the detection surface 1a by an object". The touch panel 1 has a quadrilateral (rectangular) shape when viewed in the normal direction of the detection surface 1a.

The detection surface 1a of the touch panel 1 is divided into a detection region 2 and a peripheral region 3. The detection region 2 is a region in which a touch operation can be detected. The peripheral region 3 is a frame-like region surrounding the outer periphery of the detection region 2. In FIG. 1, a boundary line L is illustrated to make the boundary between the detection region 2 and the peripheral region 3 easy to understand. The detection region 2 is divided into a plurality of individual detection regions 4. In other words, the detection region 2 is composed of a plurality of individual detection regions 4. It is detected whether a touch operation is performed in each of the individual detection regions 4.

The individual detection regions 4 are arrayed in a first direction Dx and a second direction Dy. The first direction Dx is a direction parallel to the detection surface 1a. The second direction Dy is a direction parallel to the detection surface 1a and intersecting the first direction Dx. The first direction Dx according to the present embodiment is a direction parallel to a short side 1b of the touch panel 1. The second direction Dy is a direction parallel to a long side 1c of the touch panel 1. In other words, the first direction Dx and the second direction Dy according to the present embodiment are orthogonal to each other. The normal direction (stacking direction) of the detection surface 1a is referred to as a third direction Dz.

Figure 7:
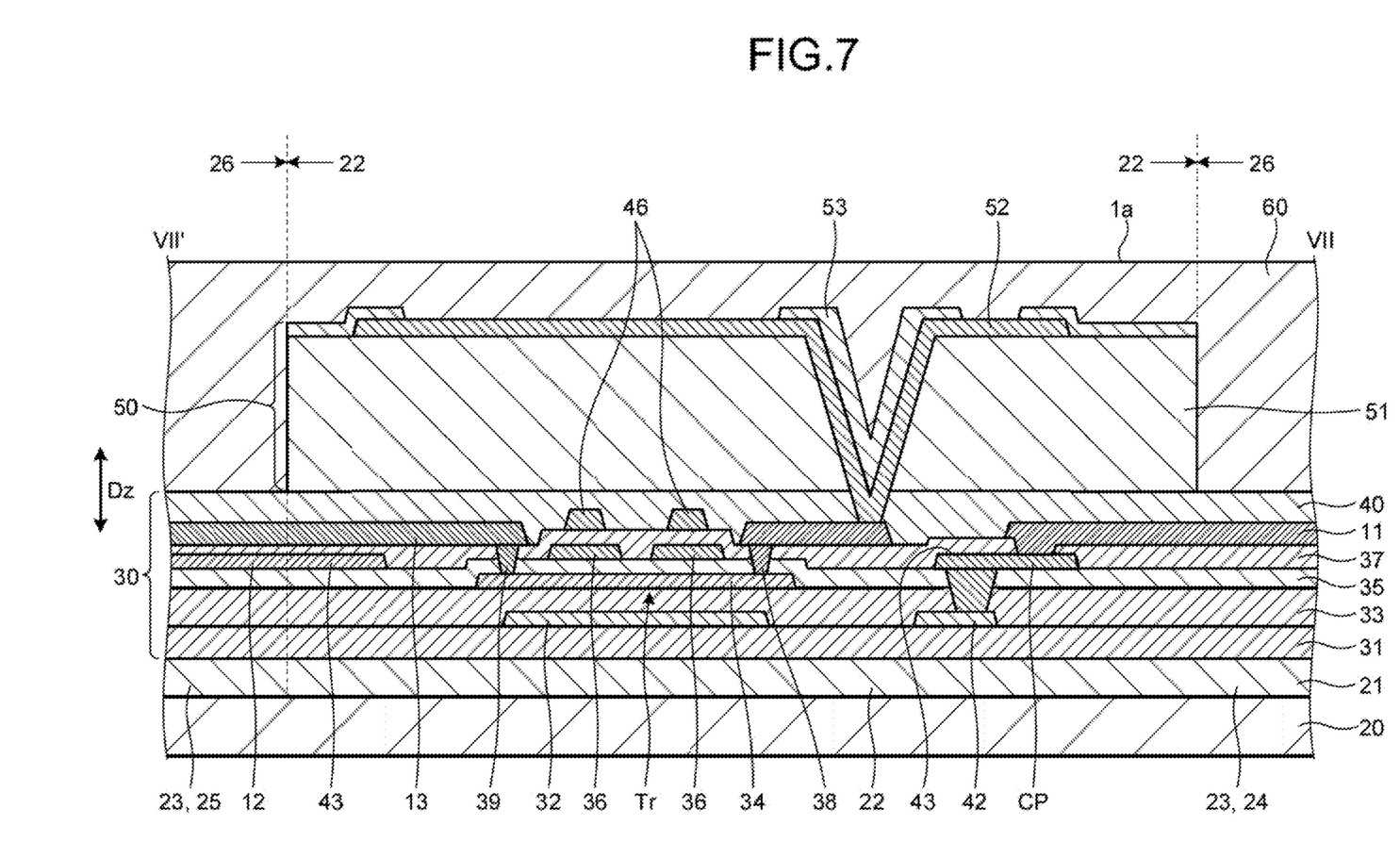
FIG. 7 is a sectional view of a body according to the first embodiment cut in a stacking direction.

Each individual detection region 4 is provided with an electrode 52 (refer to FIGS. 4 and 7, and other drawings) and a switching element Tr (refer to FIG. 7). In the individual detection region 4, it is detected, by a self-capacitance system using the electrode 52, whether a touch operation is performed. The following describes the basic principle of self-capacitance touch detection.

Figure 2:
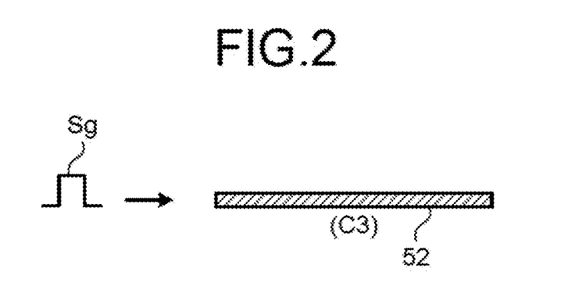
FIG. 2 is a schematic of a state where a finger is neither in contact with nor in proximity to an electrode in a self-capacitance system.
Figure 3:
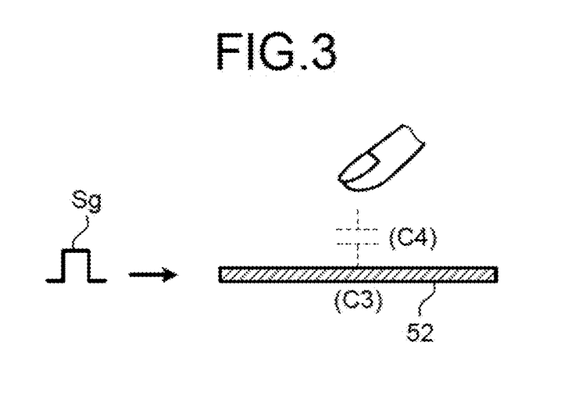
FIG. 3 is a schematic of a state where a finger is in contact with or in proximity to the electrode in the self-capacitance system.

FIG. 2 is a schematic of a state where a finger is neither in contact with nor in proximity to the electrode in the self-capacitance system. FIG. 3 is a schematic of a state where a finger is in contact with or in proximity to the electrode in the self-capacitance system. As illustrated in FIG. 2, an alternating-current (AC) square wave Sg at a predetermined frequency (e.g., a frequency of the order of several kilohertz to several hundred kilohertz) is applied to the electrode 52 when a finger is neither in contact with nor in proximity to the electrode 52. In this state, the electrode 52 has predetermined capacitance C3 and outputs an electric current corresponding to the capacitance C3.

As illustrated in FIG. 3, when a finger is in contact with or in proximity to the electrode 52, capacitance C4 between the finger and the electrode 52 is added to the capacitance C3 of the electrode 52. Therefore, when the AC square wave Sg is applied to the electrode 52, the electrode 52 has capacitance obtained by adding the capacitance C3 and the capacitance C4 and outputs an electric current corresponding to the capacitance. Thus, the electric current fluctuates between when a touch operation is performed and when no touch operation is performed. It is determined whether a touch operation is performed on the electrode 52 by detecting the fluctuation of the electric current.

Figure 4:
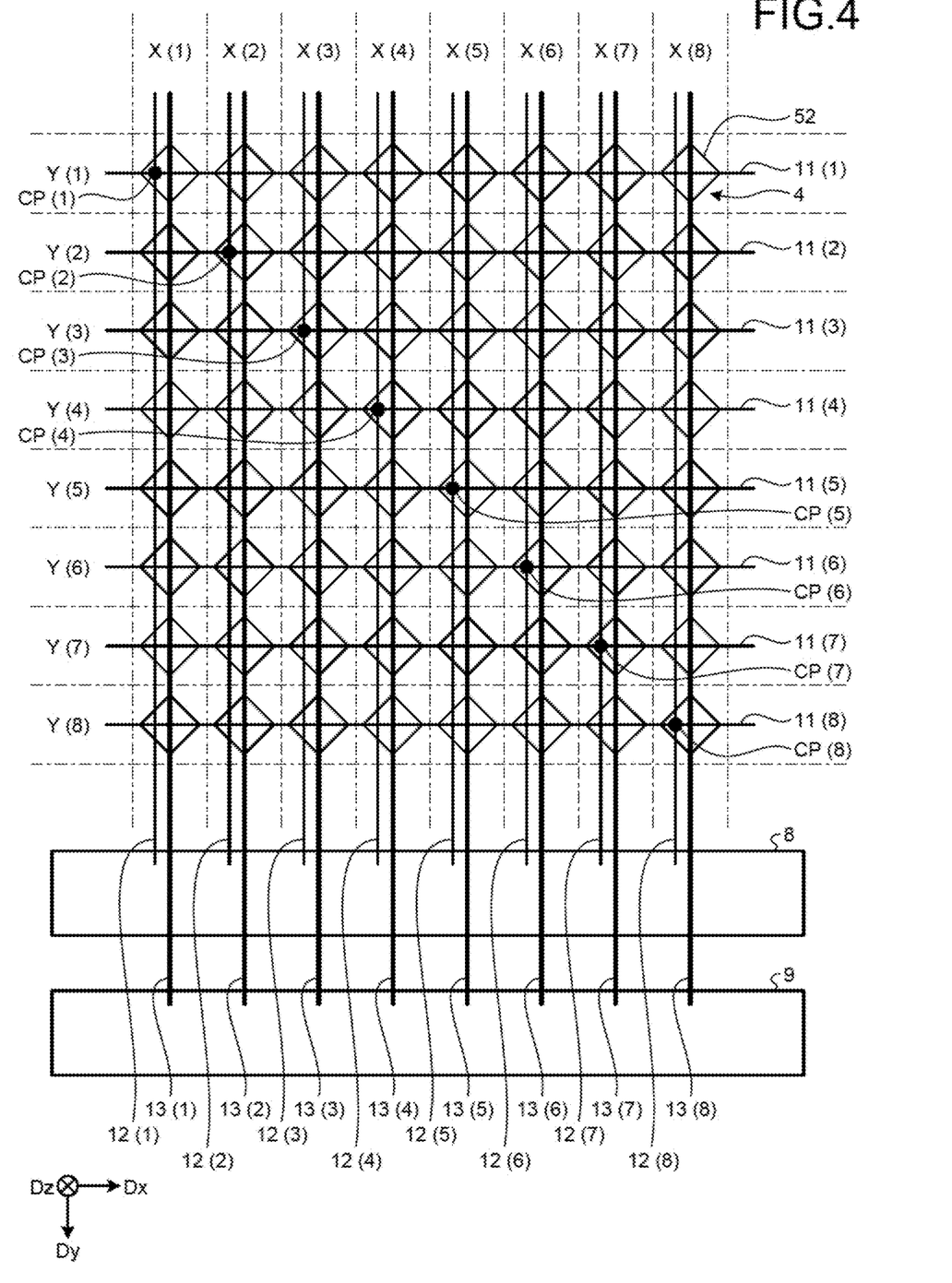
FIG. 4 is a schematic of the relation between the coordinates of a plurality of individual detection regions, gate lines, gate link lines, and signal lines.

FIG. 4 is a schematic of the relation between the coordinates of a plurality of individual detection regions, gate lines, gate link lines, and signal lines. The following describes the configuration for driving the switching element Tr (refer to FIG. 7). As illustrated in FIG. 4, the touch panel 1 includes gate lines 11, gate link lines 12, signal lines 13, a coupler 7 (refer to FIG. 1), a gate line drive circuit 8, and a signal line selection circuit 9 to drive the switching elements Tr. The source (source metal 38) of the switching element Tr is coupled to the electrode 52 (refer to FIG. 7).

In FIG. 4, 8×8 individual detection regions 4 are extracted from the individual detection regions 4. The X-coordinates of the 8×8 individual detection regions 4 are denoted by X(1), X(2), . . . , and X(8) in order in the first direction Dx. The Y-coordinates of the 8×8 individual detection regions 4 are denoted by Y(1), Y(2), . . . , and Y(8) in order in the second direction Dy.

The gate line 11 is an electrical wiring line extending in the first direction Dx. The gate line 11 is coupled to the gates (gate metals 36) of the respective switching elements Tr arrayed in the first direction Dx. In other words, the switching elements Tr arrayed in the first direction Dx share one gate line 11. A plurality of gate lines 11 are arrayed in the second direction Dy and are provided at respective Y-coordinates one by one.

The gate link line 12 is an electrical wiring line extending from the gate line drive circuit 8 in the second direction Dy. The gate link line 12 intersects the gate lines 11 in areas overlapping the respective electrodes 52 in plan view. A plurality of gate link lines 12 are arrayed in the first direction Dx and are provided at respective X-coordinates one by one. The gate link line 12 is coupled to the gate line 11 via a contact CP.

The contact CP is provided in the individual detection region 4 at the coordinates satisfying (X,Y)=(q,q) out of the individual detection regions 4. In other words, the contacts CP are arrayed in an oblique direction with respect to the first direction Dx and the second direction Dy. Specifically, a contact CP(1), for example, is provided in the individual detection region 4 at the coordinates satisfying (X,Y)=(1,1). The contact CP(1) couples the gate link line 12(1) at the X-coordinate (1) and the gate line 11(1) at the Y-coordinate (1). With this configuration, a signal from the gate line drive circuit 8 is input to the gate line 11(1) via the gate link line 12(1) and the contact CP(1).

The signal line 13 is an electrical wiring line extending from the signal line selection circuit 9 in the second direction Dy. Therefore, the signal line 13 is parallel to the gate link line 12. The signal line 13 is coupled to the drains (drain metals 39) of the respective switching elements Tr arrayed in the second direction Dy. In other words, the switching elements Tr arrayed in the second direction Dy share one signal line 13. A plurality of signal lines 13 are arrayed in the first direction Dx and are provided at respective X-coordinates one by one.

As illustrated in FIG. 1, the coupler 7, the gate line drive circuit 8, and the signal line selection circuit 9 are disposed in the peripheral region 3. The coupler 7 is coupled to a drive integrated circuit (IC) disposed outside the touch panel 1. The drive IC may be mounted as a chip on film (COF) on a flexible printed circuit board or a rigid board coupled to the coupler 7. Alternatively, the drive IC may be mounted as a chip on glass (COG) in the peripheral region 3.

The peripheral region 3 has a frame shape and has four sides. The coupler 7, the gate line drive circuit 8, and the signal line selection circuit 9 are collectively disposed on one of the four sides of the peripheral region 3. Specifically, the coupler 7, the gate line drive circuit 8, and the signal line selection circuit 9 according to the present embodiment are collectively disposed on one side in the second direction Dy with respect to the detection region 2. When the touch panel 1 is stretched in the second direction Dy (refer to arrow A1 in FIG. 1), no load acts on the coupler 7, the gate line drive circuit 8, or the signal line selection circuit 9. In other words, this configuration improves the stretchability (ease of stretching) of the touch panel 1 in the second direction Dy.

The gate line drive circuit 8 is a circuit that drives a plurality of gate lines 11 (refer to FIG. 4) based on various control signals supplied from the drive IC. The gate line drive circuit 8 sequentially selects the gate link lines 12 (gate lines 11) and supplies a gate drive signal to the selected gate line 11. The signal line selection circuit 9 is a switch circuit that sequentially selects the signal lines 13. The signal line selection circuit 9 couples the selected signal line 13 to the drive IC based on a selection signal supplied from the drive IC. The following describes the structure of the touch panel 1 in greater detail.

Figure 5:
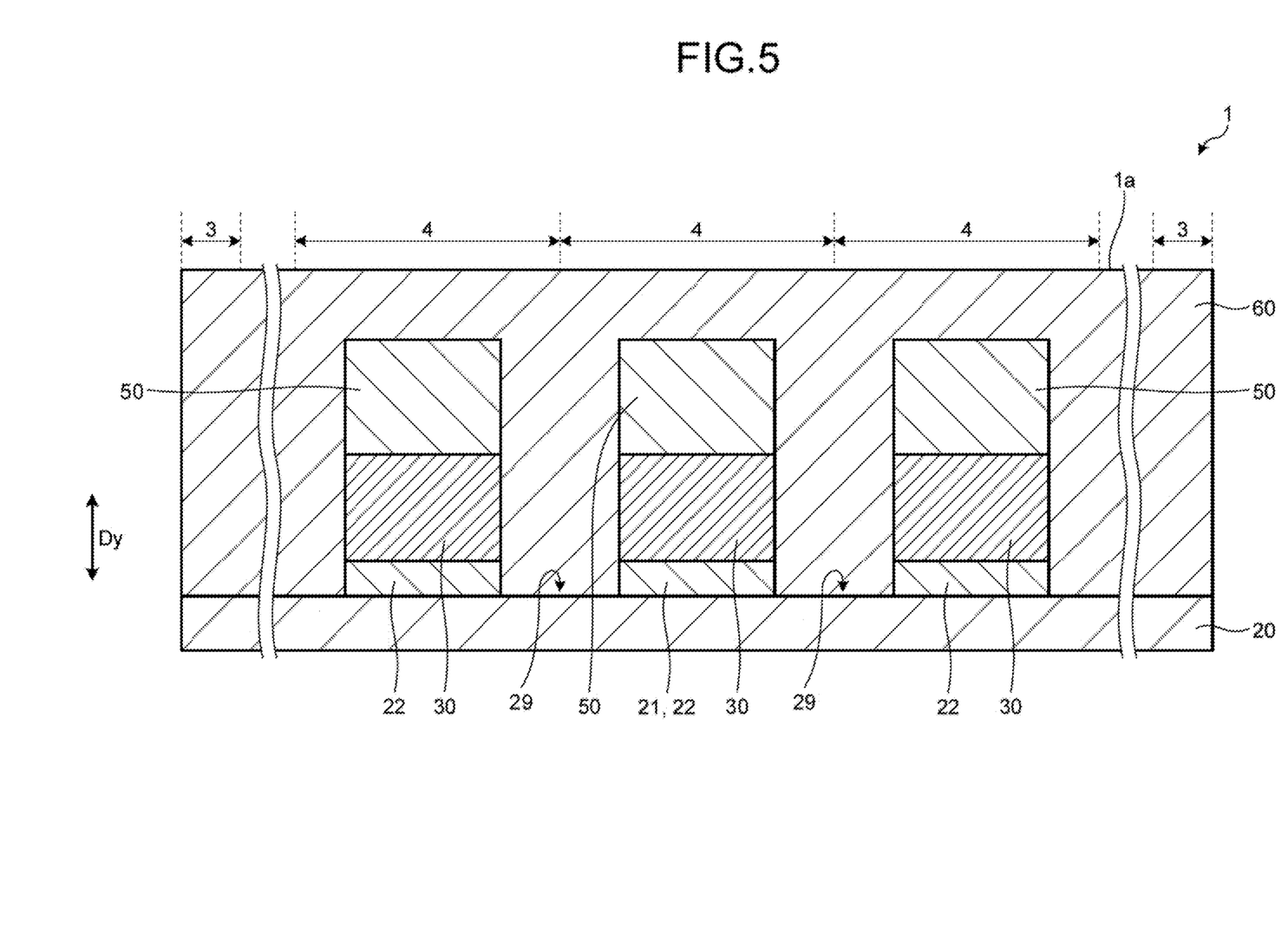
FIG. 5 is a sectional view of the touch panel according to the first embodiment cut in a third direction, and more specifically is a schematic of a section along line V-V of FIG. 6.
Figure 6:
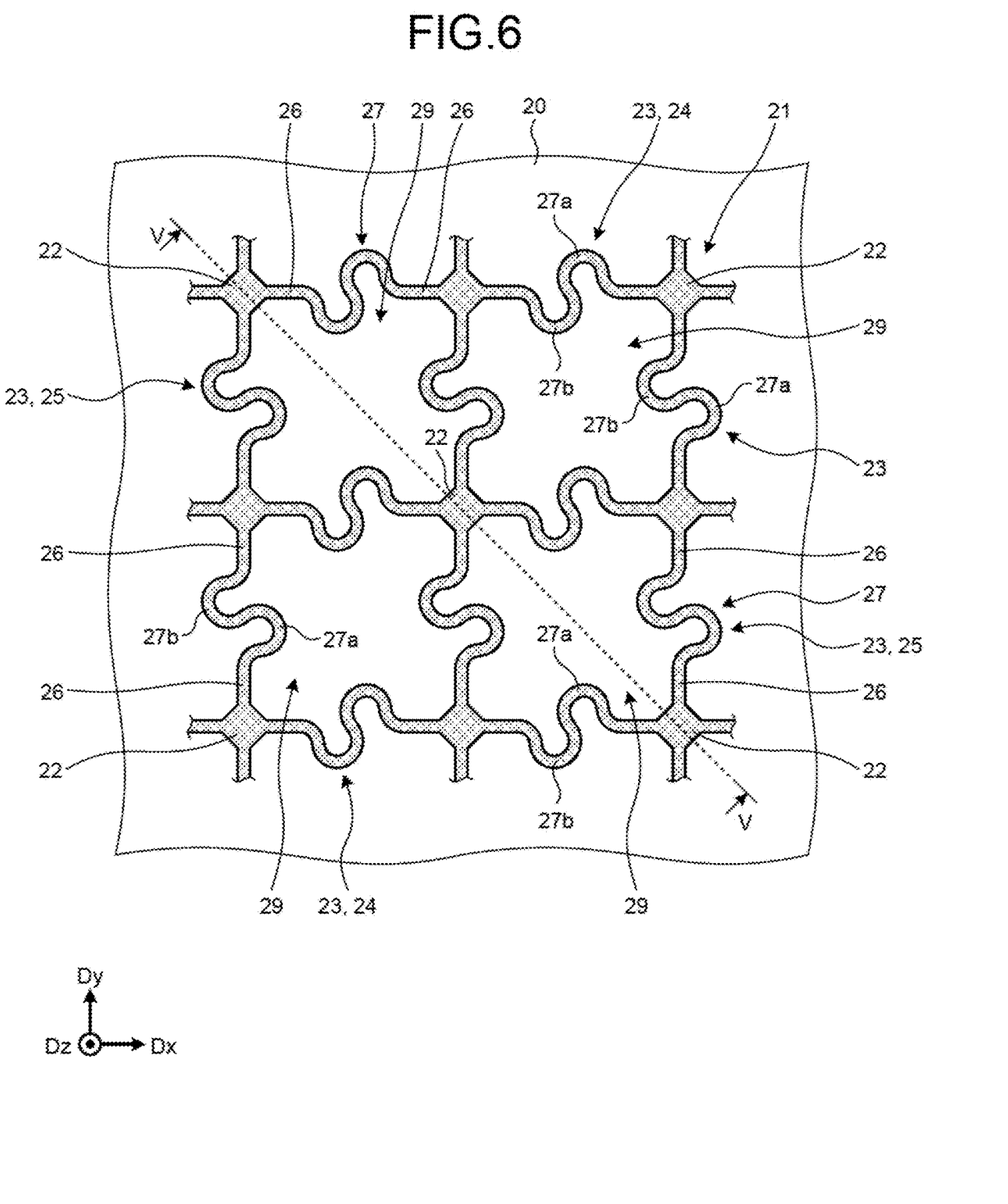
FIG. 6 is an enlarged plan view of part of a resin base member disposed in a detection region.

FIG. 5 is a sectional view of the touch panel according to the first embodiment cut in the third direction, and more specifically is a schematic of a section along line V-V of FIG. 6. As illustrated in FIG. 5, the touch panel 1 includes a first resin plate 20, a resin base member 21, an array layer 30, a functional layer 50, and a second resin plate 60. The structure composed of the resin base member 21 and the array layer 30 corresponds to the stretchable array substrate. In the touch panel 1 according to the present embodiment, the functional layer 50 includes the electrodes 52.

In the following description, upward and the upper side refer to one direction along the third direction Dz and correspond to a direction from the first resin plate 20 to the resin base member 21. Downward and the lower side refer to the other direction along the third direction Dz opposite to the one direction and correspond to a direction from the resin base member 21 to the first resin plate 20. In addition, the view from the upper side may be referred to as plan view.

The first resin plate 20 and the second resin plate 60 are made of resin material and have elasticity and flexibility. The first resin plate 20 is a base member of the touch panel 1. The second resin plate 60 has the detection surface 1a. The first resin plate 20 and the second resin plate 60 have a rectangular shape in plan view. The first resin plate 20 and the second resin plate 60 sandwich the resin base member 21, the array layer 30, and the functional layer 50.

The resin base member 21 is provided on the upper surface of the first resin plate 20. The resin base member 21 has elasticity, flexibility, and insulating properties. The resin base member 21 is made of resin material, such as polyimide.

FIG. 6 is an enlarged plan view of part of the resin base member disposed in the detection region. As illustrated in FIG. 6, the resin base member 21 includes bodies 22 and hinges 23. The bodies 22 are disposed apart from each other in the first direction Dx and the second direction Dy. The hinges 23 couple the bodies 22. The hinges 23 include first hinges 24 extending in the first direction Dx and second hinges 25 extending in the second direction Dy.

The switching element Tr is stacked on the body 22, and the electrode 52 is stacked on the switching element Tr (refer to FIG. 7). The body 22 has a rectangular shape in plan view and has four corners. The body 22 is disposed such that each of the four corners faces the first direction Dx or the second direction Dy. Each of the corners of the body 22 is joined (coupled) to the hinge 23. The shape of the body 22 in plan view is not limited to a rectangle and may be a circle or other polygonal shapes.

Electrical wiring lines are stacked on the hinges 23. Specifically, the gate lines 11 are stacked on the first hinges 24. The gate link lines 12 and the signal lines 13 are stacked on the second hinges 25. When the first hinge 24 is rotated by 90 degrees, it has the same shape as that of the second hinge 25. The following describes the shape of the hinge 23 using the first hinge 24 as an example.

The first hinge 24 has two linear portions 26 linearly extending in the first direction Dx and a bend 27 meandering when viewed in the stacking direction. The two linear portions 26 are disposed apart from each other in the first direction Dx. One end of the linear portion 26 is coupled to a corner of the body 22. In other words, the linear portion 26 extends from the body 22.

The bend 27 has a first arc 27a and a second arc 27b. The first arc 27a protrudes toward one side in the second direction Dy. The second arc 27b protrudes toward the other side in the second direction Dy. When a stretching load in the first direction Dx acts on the first hinge 24, for example, the first arc 27a and the second arc 27b deform to expand in diameter.

The resin base member 21 has a plurality of hollow portions 29 each surrounded by four hinges 23 disposed in a frame shape. The hollow portion 29 is a hole passing through the resin base member 21.

As illustrated in FIG. 5, neither the array layer 30 nor the functional layer 50 is stacked above the hollow portion 29. The hollow portion 29 is filled with the second resin plate 60 instead. With this configuration, the touch panel 1 has low rigidity in the area overlapping the hollow portion 29 and has elasticity (stretchability). When the touch panel 1 expands or contracts, the hinges 23 expand or contract, thereby reducing the amount of expansion or contraction of the bodies 22. This mechanism reduces damage to functional elements (electrodes 52 according to the present embodiment). While the hollow portion 29 according to the present embodiment is filled with the second resin plate 60, it may be filled with the first resin plate 20 or both the first resin plate 20 and the second resin plate 60. The following describes the array layer 30 and the functional layer 50 stacked on the body 22.

FIG. 7 is a sectional view of the body according to the first embodiment cut in the stacking direction. As illustrated in FIG. 7, the array layer 30 stacked on the body 22 includes an undercoat layer 31, a light-blocking metal 32, an undercoat layer 33, a semiconductor 34, a gate insulating film 35, a gate metal 36, an insulating film 37, a metal layer (a source metal 38 and a drain metal 39), and an insulating film 40. The functional layer 50 stacked on the body 22 includes a planarization film 51, an electrode 52, and an insulating film 53. The undercoat layers 31 and 33, the gate insulating film 35, the insulating film 37, the planarization film 51, and the insulating film 53 have insulating properties. The switching element Tr is a multi-gate system with two gate metals 36.

The undercoat layers 31 and 33 are coating layers made of an epoxy resin composition, for example, and may be inorganic films. The gate insulating film 35 and the insulating film 37 are insulating layers made of nitride, such as silicon nitride. The planarization film 51 is an organic planarization film made of any one of acrylic, polyimide, and polyacrylamide, for example.

The light-blocking metal 32 is disposed closer to the resin base member 21 with respect to the semiconductor 34. The light-blocking metal 32 is a layer for preventing light incident on the first resin plate 20 from reaching the semiconductor 34.

Figure 8:
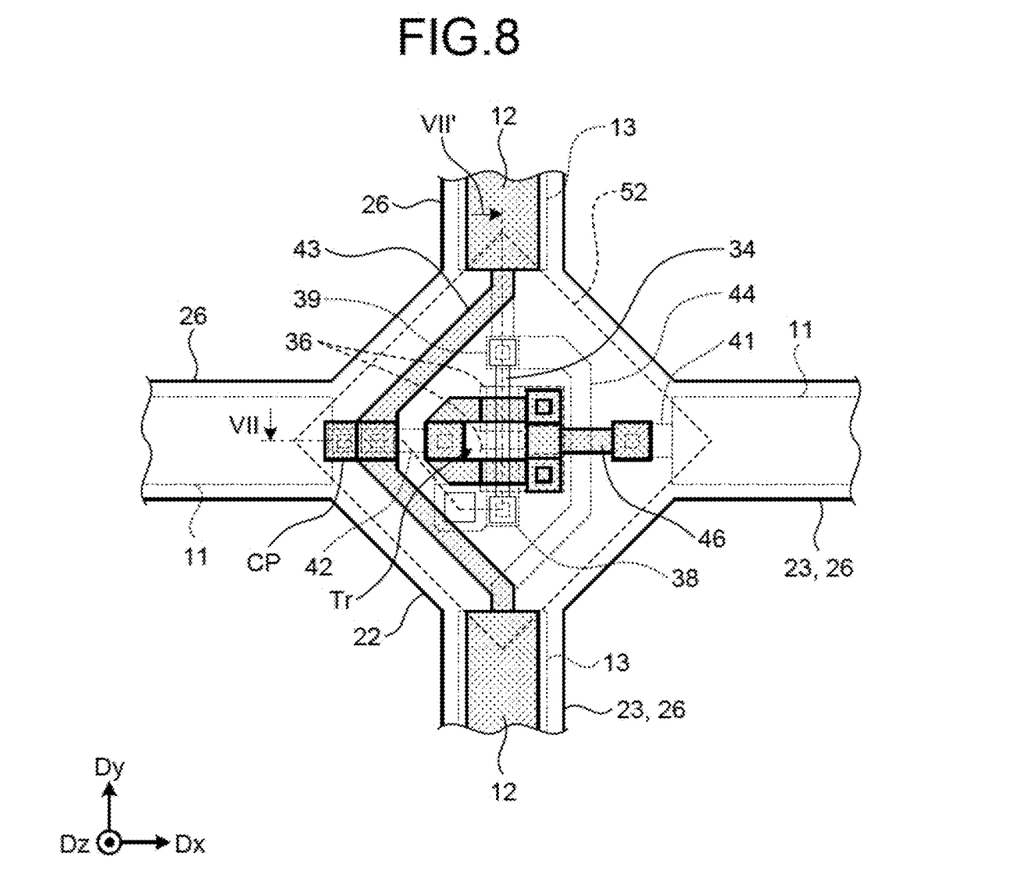
FIG. 8 is a plan view of an array layer and a functional layer stacked on the body.

FIG. 8 is a plan view of the array layer and the functional layer stacked on the body. In FIG. 8, the source (source metal 38) and the drain (drain metal 39) of the switching element Tr overlap the semiconductor 34 and the switching element Tr. As illustrated in FIG. 7, the semiconductor 34 is coupled to the source metal 38 and the drain metal 39. The two gate metals 36 are disposed between the source metal 38 and the drain metal 39 and serve as the gate of the semiconductor 34. The gate insulating film 35 is interposed between the semiconductor 34 and the gate metals 36.

The electrode 52 is made of light-transmitting conductive material, such as indium tin oxide (ITO). The electrode 52 is coupled to the source (source metal 38) of the switching element Tr.

The contact CP is provided in the array layer 30 of the individual detection region 4 at the coordinates satisfying (X,Y)=(q,q). The following describes the layout in plan view of the array layer 30 and the functional layer 50 stacked on the body 22.

As illustrated in FIG. 8, the switching element Tr is disposed at the center of the body 22. The two gate metals 36 are separated in the second direction Dy. The array layer 30 is provided with a first bypass line 43. The first bypass line 43 is a C-shaped wiring line in plan view and extends in the second direction Dy while bypassing the switching element Tr.

The gate link line 12 disposed on one side (lower side in FIG. 8) in the second direction Dy with respect to the body 22 is coupled to one end (lower end in FIG. 8) of the first bypass line 43 in the second direction Dy. The gate link line 12 disposed on the other side (upper side in FIG. 8) in the second direction Dy with respect to the body 22 is coupled to the other end (upper end in FIG. 8) of the first bypass line 43 in the second direction Dy. As a result, the gate link lines 12 stacked at the respective hinges 23 (second hinges 25) are continuously coupled in the second direction Dy.

As illustrated in FIG. 7, the gate line 11 disposed on one side (left side in FIG. 8) in the first direction Dx with respect to the body 22 is coupled to the contact CP through a contact hole. The contact CP is provided in the same layer as the first bypass line 43 and is coupled to the first bypass line 43. Therefore, the gate line 11 disposed on one side (left side in FIG. 8) in the first direction Dx with respect to the body 22 is coupled to the gate link line 12. The first bypass line 43 is coupled to a link line 42 in a lower layer through a contact hole.

As illustrated in FIG. 8, the link line 42 extends in the first direction Dx. The other end (right end in FIG. 8) of the link line 42 in the first direction Dx is coupled to a second bypass line 46 through a contact hole. The second bypass line 46 (refer to the area indicated by dots in FIG. 8) extends in the first direction Dx at the center of the body 22. The second bypass line 46 is branched out into two in the second direction Dy at the center in the first direction Dx and overlaps the two gate metals 36 in plan view. The second bypass line 46 is coupled to the two gate metals 36 through contact holes.

The other end (right end in FIG. 8) of the second bypass line 46 in the first direction Dx is coupled to a link line 41 through a contact hole. The link line 41 is coupled to the gate line 11 disposed on the other side (right side in FIG. 8) in the first direction Dx with respect to the body 22. Therefore, the gate lines 11 stacked at the respective hinges 23 (first hinges 24) are continuously coupled in the first direction Dx.

The semiconductor 34 extends in the second direction Dy under the two gate metals 36. One end (lower end in FIG. 8) of the semiconductor 34 in the second direction Dy is coupled to the electrode 52 via the source metal 38.

The other end (upper end in FIG. 8) of the semiconductor 34 in the second direction Dy is coupled to the drain metal 39. The drain metal 39 is coupled to a third bypass line 44. The third bypass line 44 is a C-shaped wiring line in plan view and extends around the switching element Tr. One end (lower end in FIG. 8) of the third bypass line 44 in the second direction Dy is coupled to the signal line 13 disposed on one side (lower side in FIG. 8) in the second direction Dy with respect to the body 22. By contrast, the other end (upper side in FIG. 8) of the third bypass line 44 in the second direction Dy is coupled to the signal line 13 disposed on the other side (upper side in FIG. 8) in the second direction Dy with respect to the body 22. Therefore, the signal lines 13 stacked at the respective hinges 23 (second hinges 25) are continuously coupled in the second direction Dy by the third bypass line 44.

Figure 9:
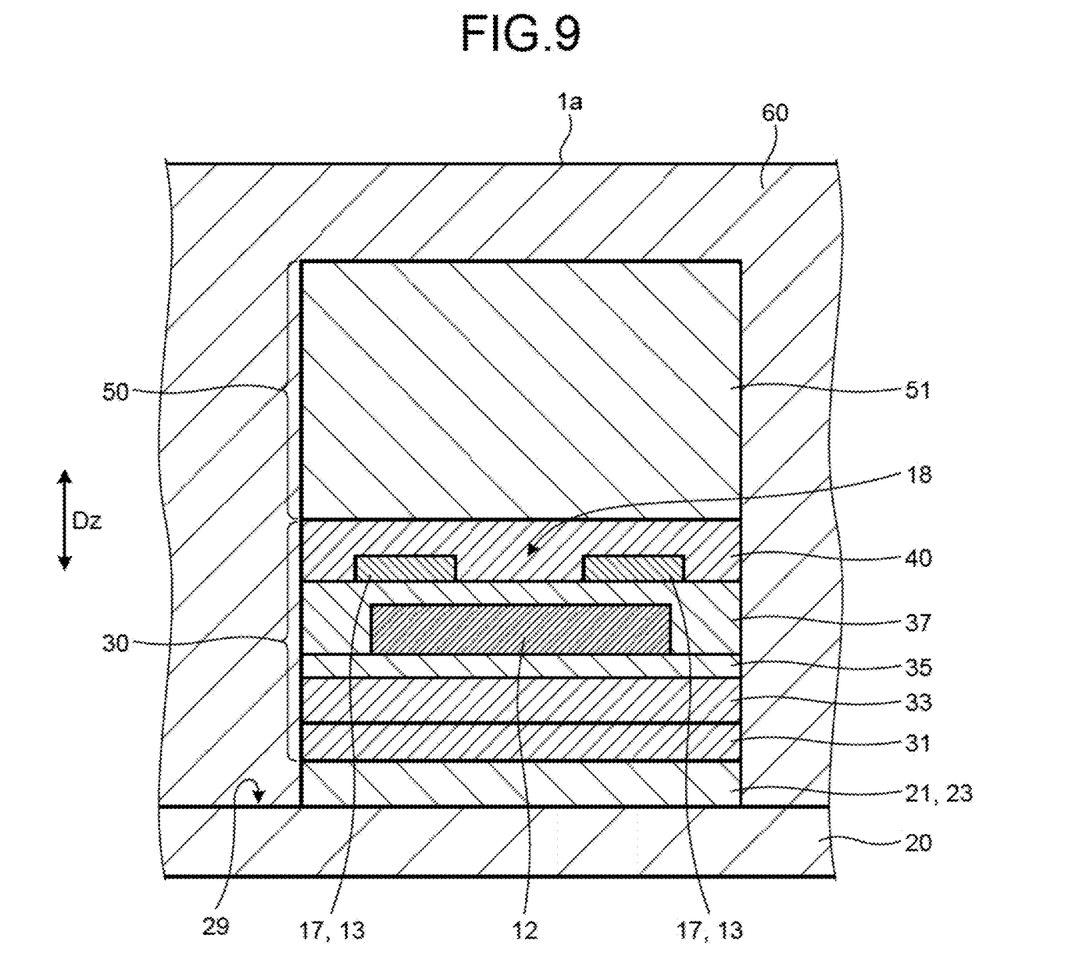
FIG. 9 is a sectional view of a second hinge according to the first embodiment cut in the stacking direction, and more specifically is a sectional view seen in the arrow direction along line IX-IX of FIG. 10.

The following describes the multilayered structure of the hinge. FIG. 9 is a sectional view of the second hinge according to the first embodiment cut in the stacking direction, and more specifically is a sectional view seen in the arrow direction along line IX-IX of FIG. 10. As illustrated in FIG. 9, the array layer 30 stacked on the second hinge 25 includes the undercoat layer 31, the undercoat layer 33, the semiconductor 34, the gate link line 12, the insulating film 37, the signal line 13, and the insulating film 40. The functional layer 50 stacked on the second hinge 25 is only the planarization film 51.

The array layer 30 stacked on the first hinge 24 includes the undercoat layer 31, the undercoat layer 33, the semiconductor 34, the gate line 11, the insulating film 37, the insulating film 40, and the planarization film 51, which are not specifically illustrated. The gate line 11, the gate link line 12, and the signal line 13 are made of tantalum (Ta). The following describes the layout (shape) of the signal line 13 in plan view.

Figure 10:
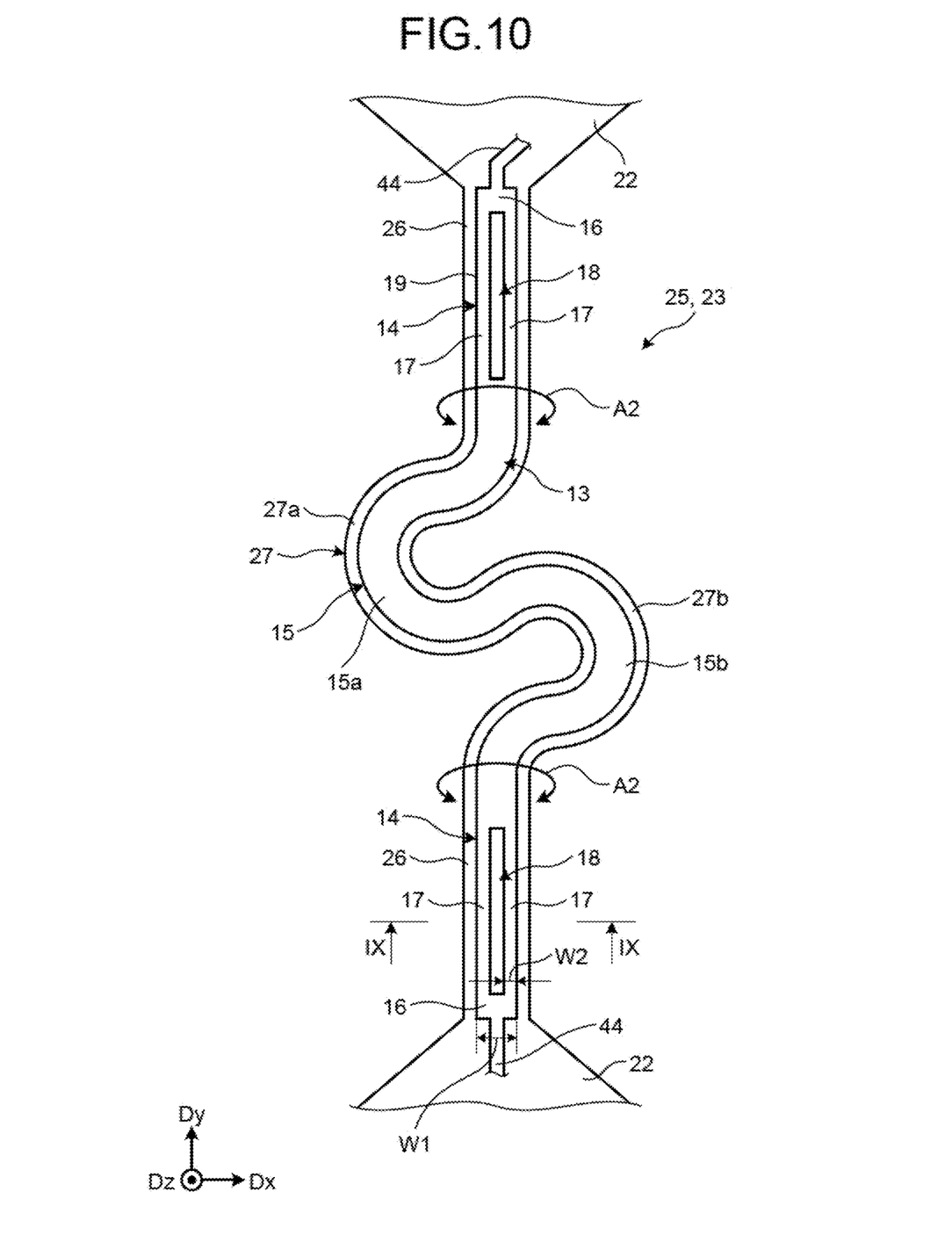
FIG. 10 is a plan view of the signal line stacked on the second hinge.

FIG. 10 is a plan view of the signal line stacked on the second hinge. As illustrated in FIG. 10, the signal line 13 includes a first electrical line 14 stacked on the linear portion 26 and a second electrical line 15 stacked on the bend 27.

The first electrical line 14 linearly extends in the second direction Dy along the linear portion 26. One end of the first electrical line 14 serves as a joint 16 coupled to the end of the third bypass line 44. The width in the first direction Dx of the joint 16 is W1. In the following description, the part of the first electrical line 14 other than the joint 16 is referred to as a wiring body 19.

The wiring body 19 has a thin wiring portion 17. The width in the first direction Dx of the thin wiring portion 17 is W2. The width W2 of the thin wiring portion 17 is smaller than the width W1 of the joint 16. Therefore, the thin wiring portion 17 is less rigid and more likely to be deformed than the joint 16.

The wiring body 19 according to the present embodiment has two thin wiring portions 17. The two thin wiring portions 17 are disposed apart from each other in the first direction Dx. A through hole 18 passing through the first electrical line 14 is formed between the two thin wiring portions 17. The through hole 18 is filled with the insulating film 40 provided on the first electrical line 14 (refer to FIG. 9).

The second electrical line 15 extends along the bend 27. Therefore, the second electrical line 15 has a first arc wiring portion 15a and a second arc wiring portion 15b. The first arc wiring portion 15a has an arc shape along the first arc 27a. The second arc wiring portion 15b has an arc shape along the second arc 27b. The width (length in the direction intersecting the longitudinal direction) of the first arc wiring portion 15a and the second arc wiring portion 15b is equal to the width W1 of the joint 16.

When a tensile load acts in the second direction Dy in the touch panel 1 according to the first embodiment, for example, the first arc 27a and the second arc 27b of the bend 27 deform to expand in diameter. As a result, a torsional load represented by arrow A2 in FIG. 10 acts on the linear portion 26 from the bend 27. Therefore, the first electrical line 14 stacked on the linear portion 26 is twisted in the direction of arrow A2. The wiring body 19 has the thin wiring portion 17 and has low rigidity. Therefore, the wiring body 19 (thin wiring portion 17) of the first electrical line 14 is greatly twisted. In other words, the torsional load acting on the joint 16 is absorbed by the thin wiring portion 17. This mechanism reduces deformation of the joint 16 and prevents damage to the joint 16.

While the above has described the first embodiment where the thin wiring portion 17 is included in the signal line 13 out of the electrical wiring lines, the thin wiring portion 17 according to the present disclosure may be included in the gate line 11 and/or the gate link line 12. Next, other forms of the thin wiring portion 17 are described. The following describes only the differences from the first embodiment.

First Modification

Figure 11:
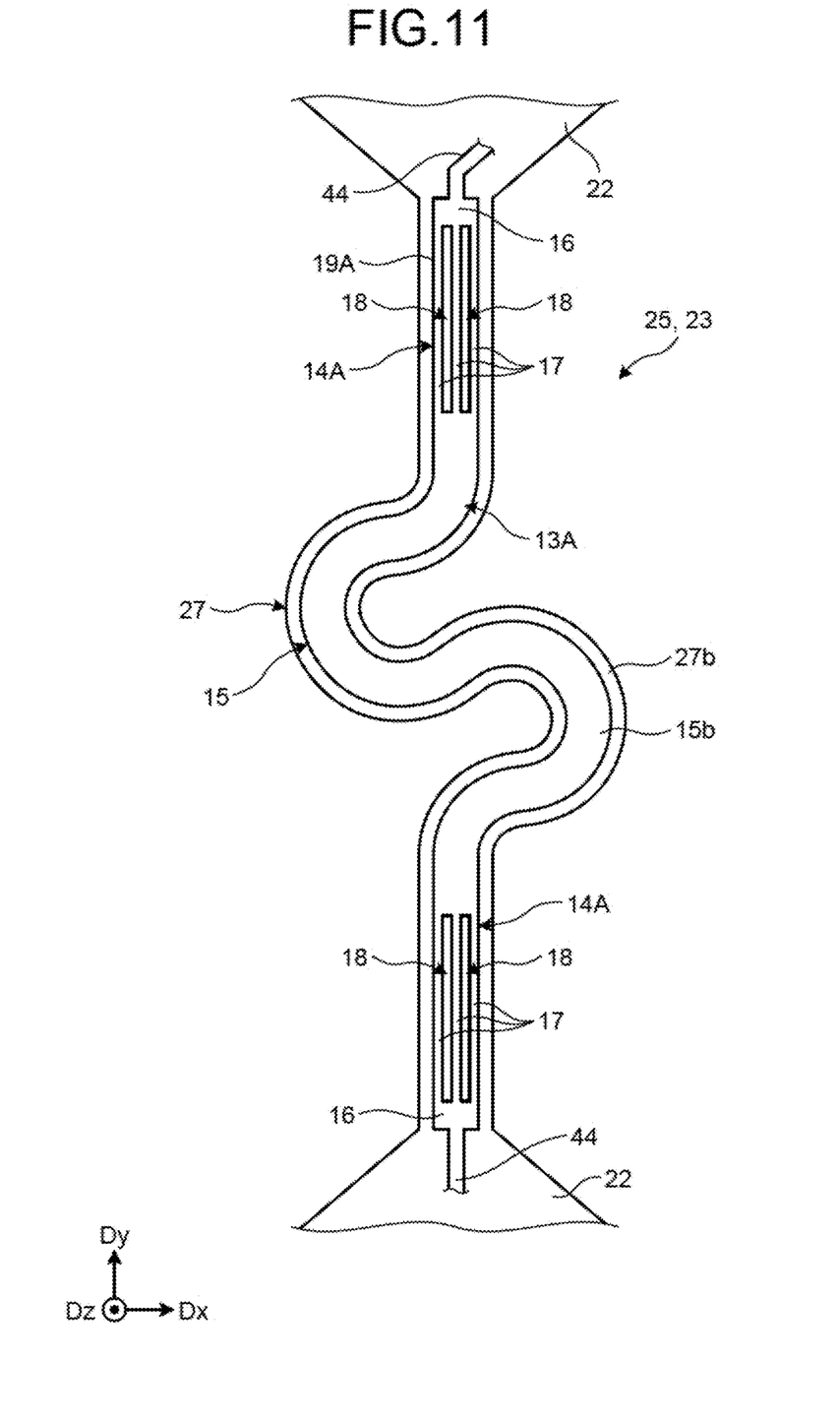
FIG. 11 is a plan view of a signal line according to a first modification.

FIG. 11 is a plan view of a signal line according to a first modification. The first modification is different from the first embodiment in that a wiring body 19A of first electrical line 14A of a signal line 13A according to the first modification has three thin wiring portions 17. In other words, the wiring body 19A has two through holes 18. Also in this example, deformation of the joint 16 is reduced similarly to the first embodiment. The configuration according to the present disclosure does not necessarily have a plurality of thin wiring portions 17 and may have one thin wiring portion 17.

Second Embodiment

Figure 12:
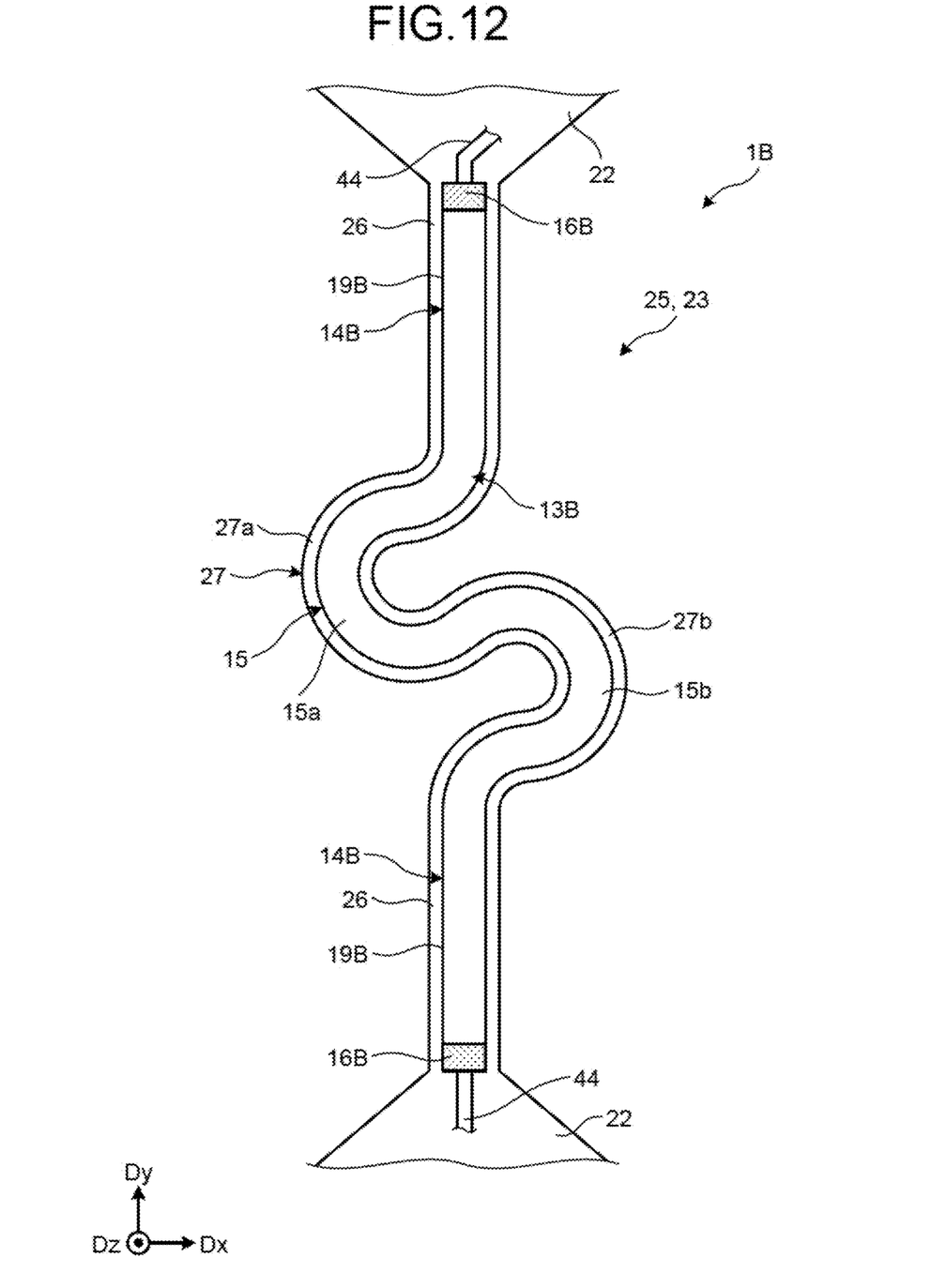
FIG. 12 is a plan view of a signal line according to a second embodiment.

FIG. 12 is a plan view of a signal line according to a second embodiment. The following describes a touch panel 1B according to the second embodiment. A signal line 13B (electrical wiring line) of the touch panel 1B according to the second embodiment includes a first electrical line 14B stacked on the linear portion 26 and the second electrical line 15 stacked on the bend 27. The width W3 in the first direction Dx of the first electrical line 14B is constant in the longitudinal direction. One end of the first electrical line 14B is provided with a joint 16B coupled to the end of the third bypass line 44.

A wiring body 19B is made of Ta as in the first embodiment. By contrast, the joint 16B is made of material with high toughness. Examples of the material with high toughness include, but are not limited to, gold (Au), silver (Ag), copper (Cu), and the like.

When a tensile load acts in the second direction Dy in the configuration according to the second embodiment, a torsional load acts on the first electrical line 14B. The torsional load uniformly acts on the entire first electrical line 14B in the longitudinal direction. Therefore, the joint 16B is twisted in the same way as the wiring body 19B. The joint 16B, however, is hardly damaged because it has high toughness.

While the above has described the second embodiment where only the joint 16B is made of material with high toughness, the length in the longitudinal direction of the portion made of Au, Ag, or Cu according to the present disclosure simply needs to be at least 10 µm. In other words, the entire first electrical line 14B may be made of material with high toughness.

Third Embodiment

Figure 13:
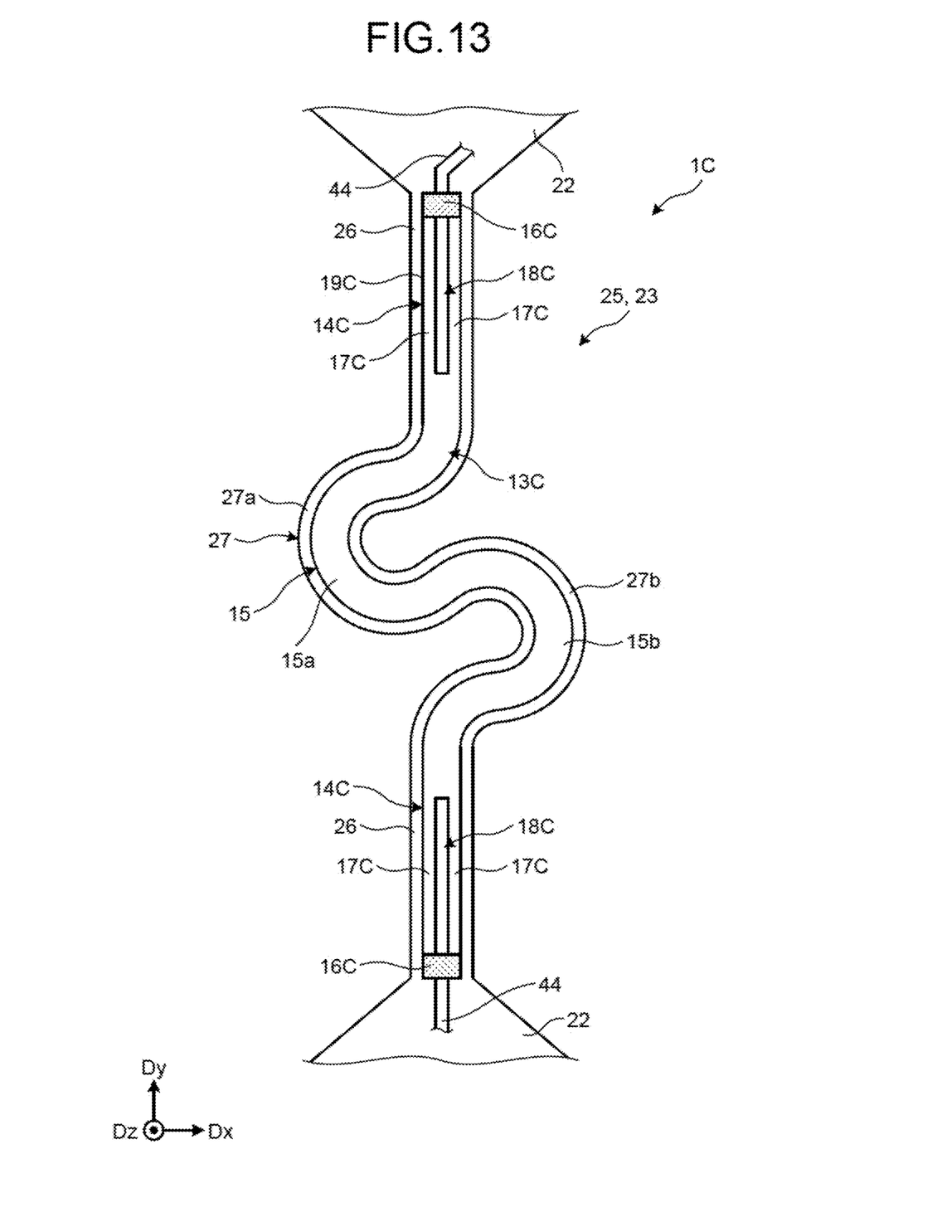
FIG. 13 is a plan view of a signal line according to a third embodiment.

FIG. 13 is a plan view of a signal line according to a third embodiment. A touch panel 1C according to the third embodiment is different from the first embodiment in that it includes a signal line 13C (electrical wiring line).

The signal line 13C includes a first electrical line 14C stacked on the linear portion 26 and the second electrical line 15 stacked on the bend 27. One end of the first electrical line 14C is provided with a joint 16C coupled to the end of the third bypass line 44. The joint 16C is made of material with high toughness, such as Au, Ag, and Cu, similarly to the joint 16B according to the second embodiment. Therefore, the joint 16C is hardly damaged if it is deformed.

A wiring body 19C has one through hole 18C. In other words, the wiring body 19C has two thin wiring portions 17C similarly to the wiring body 19 according to the first embodiment. With this configuration, the wiring body 19C has low rigidity and absorbs deformation of the first electrical line 14C. Therefore, the amount of deformation of the joint 16C is reduced.

What is claimed is:
1. A stretchable array substrate comprising:
a resin base member; and
an array layer stacked on the resin base member, wherein the resin base member comprises:
    a plurality of bodies disposed apart from each other; and
    a plurality of hinges that couple the bodies,
the array layer comprises electrical wiring lines stacked on the hinges,
the hinges each comprise:
    a linear portion having a linear shape when viewed in a stacking direction in which the resin base member and the array layer are stacked and having a first end coupled to a corresponding one of the bodies; and a bend that meanders when viewed in the stacking direction and couples second ends of two of the linear portions, the electrical wiring lines comprise:
a first electrical line stacked on the linear portion; and
a second electrical line stacked on the bend, and the first electrical line is provided with:
a joint stacked on the first end of the linear portion; and
a thin wiring portion that is closer to the second end of the linear portion than the joint and that extends along the linear portion, the thin wiring portion having a length in a width direction intersecting a longitudinal direction of the first electrical line smaller than a length in the width direction of the joint when viewed in the stacking direction.

2. The stretchable array substrate according to claim 1, wherein two or more of the thin wiring portions are provided in the width direction,
each of the two or more of the thin wiring portions extends along the linear portion on which the first electrical line is stacked, and
a space between two of the thin wiring portions is a through hole passing through the first electrical line in the stacking direction.

3. A stretchable array substrate comprising:
a resin base member; and
an array layer stacked on the resin base member, wherein the resin base member comprises:
a plurality of bodies disposed apart from each other; and
a plurality of hinges that couple the bodies, the array layer comprises electrical wiring lines stacked on the hinges, the hinges each comprise:
a linear portion having a linear shape when viewed in a stacking direction in which the resin base member and the array layer are stacked and having a first end coupled to a corresponding one of the bodies; and
a bend that meanders when viewed in the stacking direction and couples second ends of two of the linear portions, the electrical wiring lines comprise:
a first electrical line stacked on the linear portion; and
a second electrical line stacked on the bend, the first electrical line comprises a joint that is stacked on the first end of the linear portion and that has sides along an extending direction of the linear portion, and the joint is made of any one of Au, Ag, and Cu.

4. The stretchable array substrate according to claim 3, wherein the entire first electrical line is made of any one of Au, Ag, and Cu.

5. The stretchable array substrate according to claim 3, wherein the first electrical line is provided with a thin wiring portion that is closer to the second end of the linear portion than the joint and that extends along the linear portion, the thin wiring portion having a length in a width direction intersecting a longitudinal direction of the first electrical line smaller than a length in the width direction of the joint when viewed in the stacking direction.

6. The stretchable array substrate according to claim 5, wherein two or more of the thin wiring portions are provided in the width direction,
each of the two or more of the thin wiring portions extends along the linear portion on which the first electrical line is stacked, and
a space between two of the thin wiring portions is a through hole passing through the first electrical line in the stacking direction.

* * * * *